US012139934B2

(12) United States Patent
Singh

(10) Patent No.: US 12,139,934 B2
(45) Date of Patent: Nov. 12, 2024

(54) STRIKE ASSEMBLY FOR DOOR LOCKING MECHANISM

(71) Applicant: DORMAKABA CANADA INC., Montréal (CA)

(72) Inventor: Mandeep Singh, Kitchener (CA)

(73) Assignee: DORMAKABA CANADA INC., Montreal (CA)

( * ) Notice: Subject to any disclaimer, the term of this patent is extended or adjusted under 35 U.S.C. 154(b) by 1077 days.

(21) Appl. No.: 16/960,201

(22) PCT Filed: Mar. 5, 2019

(86) PCT No.: PCT/CA2019/050260
§ 371 (c)(1),
(2) Date: Jul. 6, 2020

(87) PCT Pub. No.: WO2019/169483
PCT Pub. Date: Sep. 12, 2019

(65) Prior Publication Data

US 2021/0054651 A1 Feb. 25, 2021

Related U.S. Application Data

(60) Provisional application No. 62/639,021, filed on Mar. 6, 2018.

(51) Int. Cl.
*E05B 15/02* (2006.01)

(52) U.S. Cl.
CPC ................................ *E05B 15/0205* (2013.01)

(58) Field of Classification Search
CPC .... E05B 15/02; E05B 15/0205; E05B 15/022; E05B 15/0225; E05B 15/024; E05B 15/0245; E05B 15/0255; E05B 2015/0275; E05B 17/0045; E05B 17/007; E05B 63/0056; E05B 63/006; Y10T 292/0908; Y10T 292/0909; Y10T 292/091; Y10T 292/68; Y10T 292/683; Y10T 292/685; Y10T 292/688; Y10T 292/691; Y10T 292/694; Y10T 292/705; Y10T 292/707;
(Continued)

(56) References Cited

U.S. PATENT DOCUMENTS 2,013,145 A 9/1935 Goetz
2005/0134061 A1* 6/2005 Milo .................... E05B 15/022 292/340
(Continued)

FOREIGN PATENT DOCUMENTS

CA 2850072 C 3/2017
DE 10328330 A1 * 1/2005 ........... E05B 15/022

*Primary Examiner* — Christine M Mills
*Assistant Examiner* — Yahya Sidky
(74) *Attorney, Agent, or Firm* — Alexandre Daoust; Norton Rose Fulbright Canada LLP

(57) ABSTRACT

The strike assembly can have a strike with a strike face, a socket in the strike face for receiving a male locking member retractably mounted to a door, the socket having a shim-receiving wall integral to and normal to the strike face, the shim-receiving wall having a receiving aperture, an insert being securely engageable into the receiving aperture along an insert engagement path, and a shim plate held firmly in the socket, against the shim-receiving wall, by the insert, when the insert is engaged into the receiving aperture.

21 Claims, 6 Drawing Sheets

(58) Field of Classification Search
CPC .... Y10S 292/53; Y10S 292/54; Y10S 292/55; Y10S 292/56; Y10S 292/57; Y10S 292/60; Y10S 292/64; Y10S 292/73
See application file for complete search history.

(56) References Cited

U.S. PATENT DOCUMENTS

| | | | | |
|---|---|---|---|---|
| 2007/0182168 | A1* | 8/2007 | Allen | E05B 15/024 292/340 |
| 2011/0031768 | A1* | 2/2011 | Scheffler | E05B 47/0046 292/341.16 |
| 2013/0088023 | A1* | 4/2013 | Singh | E05B 47/0047 292/341.16 |

* cited by examiner

STRIKE ASSEMBLY FOR DOOR LOCKING MECHANISM

FIELD

The present disclosure relates generally to door systems, and more particularly to strike assemblies for such door system.

BACKGROUND

Deadlatches provide better tamper resistance than simple spring latches. In addition to a primary latch, a deadlatch system includes a deadlatch lever which is designed to be pushed into a depressed configuration by the strike when the primary latch is engaged with the socket. The primary latch can be similar to a spring latch, except that the deadlatch lever is mechanically connected to the primary latch, and blocks the retraction ability of the primary latch for as long as the deadlatch lever remains depressed. The mechanism can thus prevent an unauthorized person to tamper with the engaged primary latch, such as by depressing it using a screwdriver or the like.

The deadlatch lever comes in various forms. In some cases, the deadlatch lever can be relatively thin and immediately adjacent the primary latch, which can make them prone to unintentionally depressing into the socket which is intended for the primary latch and not functioning properly.

Indeed, it will be understood that when installing a latch system, it is relevant to ensure a reliable engagement of the primary latch with the strike's socket. To this end, as a certain amount of variability can be associated to differing installation sites, it can be desired to make the strike's socket larger than the size of the primary latch, so that the primary latch will correctly engage the socket even if it is slightly misaligned with it. However, this motivation of making the socket larger than the primary latch increases the likelihood that the deadlatch lever could undesirably engage the socket.

Accordingly, while deadlatch systems were satisfactory to a certain degree, there remained room for improvement.

SUMMARY

Typically, at the installation site, the degree of alignment between the primary latch and the socket becomes known. At that point, it can become desirable to secure a shim of a suitable dimension to one of the walls of the socket, in the depression path of the deadlatch latch, to prevent the deadlatch latch from extending into the socket. However, it will be understood that the size of the strike's socket is relatively small and constrained, which can make actions such as drilling holes or tapping threads into a corresponding internal wall of the strike socket at the installation site difficult. Moreover, it can be desired to provide a unitary housing for the strike which integrally delimits its exposed internal and external surfaces, including walls of the strike socket, additionally restricting drilling or tapping access to the socket walls.

In accordance with one aspect, there is provided a strike having a housing having an internal socket wall having an aperture, and an insert configured to engage with the aperture, the insert having a female thread extending normal to the internal socket wall when the insert is engaged with the aperture. During installation, rectangular shims fitting the size of the wall and having an aperture alignable with the female thread of the insert can be fastened with the insert, the insert itself being trapped in its engaged configuration.

In accordance with another aspect, there is provided a strike assembly for mounting to a door frame, the strike assembly having a strike with a strike face, a socket in the strike face for receiving a male locking member retractably mounted to a door, the socket having a shim-receiving wall integral to and normal to the strike face, the shim-receiving wall having a receiving aperture, an insert being securely engageable into the receiving aperture along an insert engagement path, and a shim plate held firmly in the socket, against the shim-receiving wall, by the insert, when the insert is engaged into the receiving aperture.

In accordance with another aspect, there is provided a method of mounting a strike assembly to a door frame, the strike assembly having a strike with a strike face, a socket in the strike face for receiving a male locking member retractably mounted to a door, the socket having a shim-receiving wall made integral to the strike face and projecting normal to the strike face, the shim-receiving wall having a receiving aperture, an insert having two parallel external edges and a female thread, a shim plate having a bore, and a fastener, the method comprising: engaging the insert into the receiving aperture, including matingly engaging the two parallel external edges of the insert with the two parallel internal edges of the shim-receiving wall via an open side of the receiving aperture and sliding the insert into full engagement with the receiving aperture; mounting the strike, with the engaged insert, to the door frame; engaging the shim plate into the socket, and superposing it with the shim-receiving wall in a manner for the bore to be aligned with the female thread; engaging a fastener across the bore and into the female thread to secure the shim plate against the shim-receiving wall.

In accordance with another aspect, there is provided a door system comprising a door hinged at a first edge to a first side of a door frame via a door hinge, the door having a locking mechanism of the deadlatch type and including a primary latch member and a deadlatch lever both retractably mounted to the door in a manner to protrude from a second edge of the door opposite the hinge, adjacent one another, the primary latch member being spring-biased to an extended configuration and being locked in an extended configuration when the deadlatch lever is in a retracted configuration, and a strike assembly, the strike assembly having a strike with a strike face for holding the deadlatch lever in the retracted configuration, the strike being mounted to the door frame, a socket in the strike face for receiving the primary latch member, the socket having a shim-receiving wall integral to and extending normal to the strike face, away from the door, the shim-receiving wall having a receiving aperture, and an insert being securely engaged into the receiving aperture along an insert engagement path, and a shim plate held firmly in the socket, against the shim-receiving wall, by the insert.

Many further features and combinations thereof concerning the present improvements will appear to those skilled in the art following a reading of the instant disclosure.

DESCRIPTION OF THE FIGURES

In the figures.

DETAILED DESCRIPTION

Figure 1A:
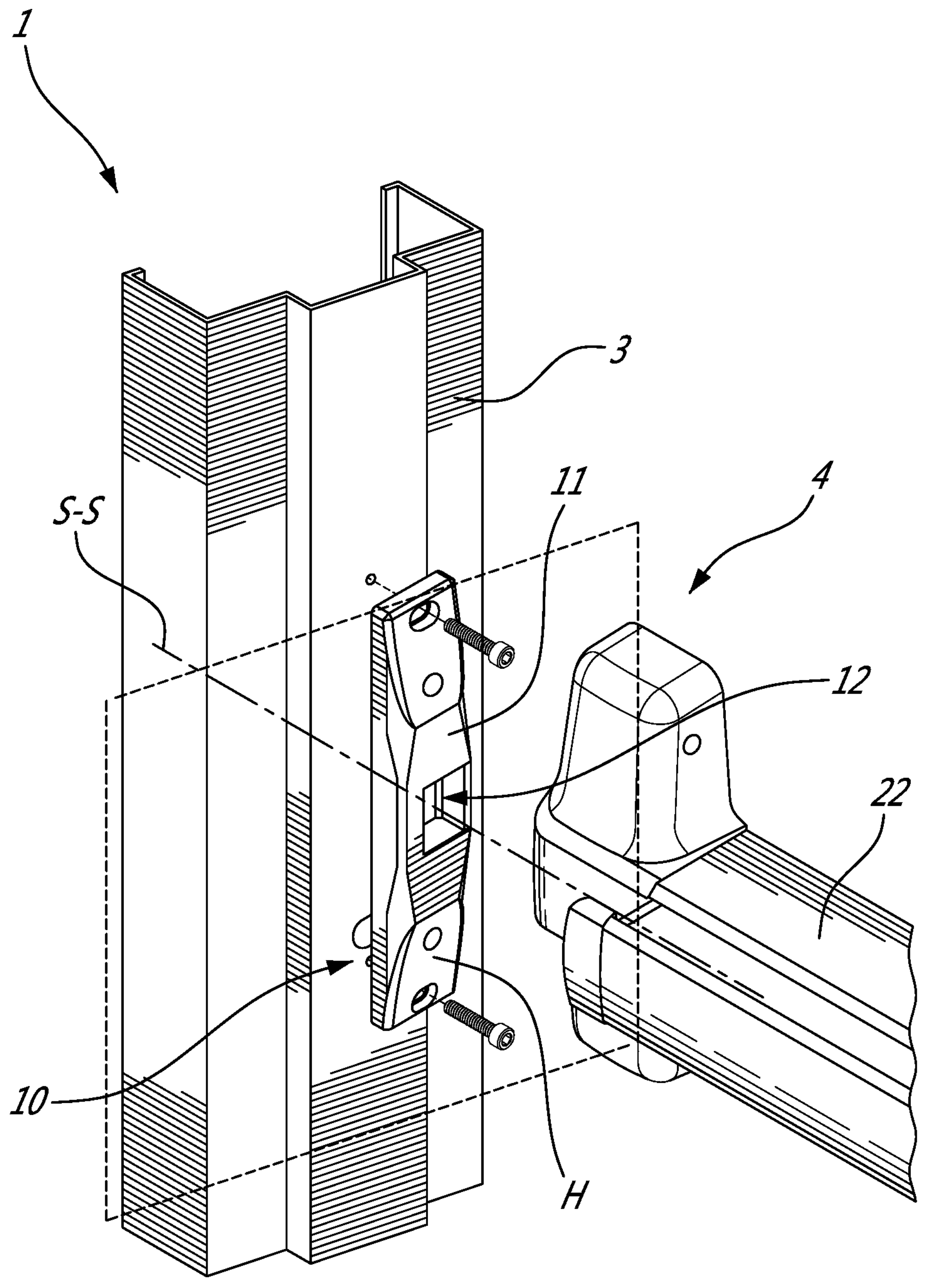
FIG. 1A is an oblique view of a door system having a strike, FIG. 1B being a cross-sectional view of the door system of FIG. 1A in the closed configuration.
Figure 1B:
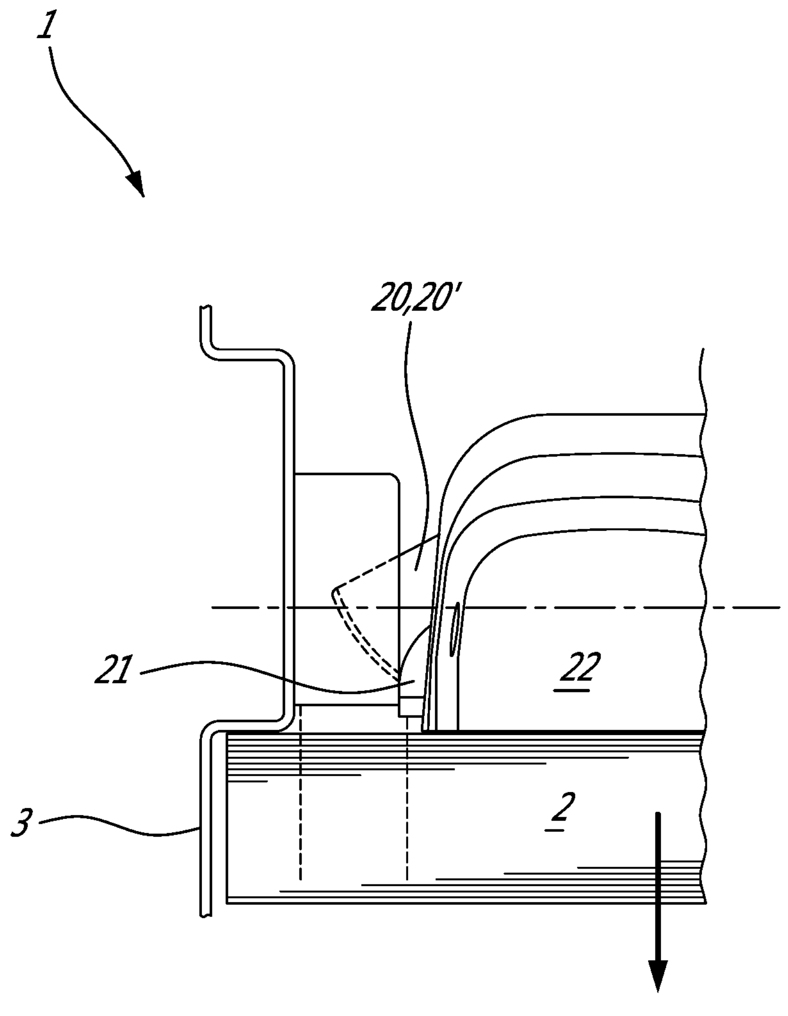

FIGS. 1A and 1B show an example of a door system 1 having a door 2, a door frame 3, and a locking mechanism 4. The locking mechanism 4 generally includes an example of a strike 10 which is mounted to the door frame 3, and a male locking member 20 which is retractably mounted to the door 2. As well known in the art, the locking system is provided on one side/edge of the door 2 and frame 3, and hinges are provided at the other edge of the door 2, which allow pivoting the door 2 relative to the frame 3 to open the door 2 in a direction shown by the arrow on FIG. 1B.

The strike 10 has a socket 12 which is designed to receive the male locking member 20 when the door 2 is closed. When the door 2 is locked, the male locking member 20 is trapped in the socket 12, which prevents the door 2 from pivoting. In this configuration, both the male locking member 20 and the socket 12 matingly extend in a horizontal orientation parallel with the orientation of the width of the door 2. This orientation will be referred to herein as the socket axis S-S.

Referring to FIG. 1B, the door 2 can have a locking mechanism 4 of the deadlatch type, including a primary latch member 20', which can alternately be referred to as the male locking member 20 in this embodiments, and a deadlatch lever 21. In locking mechanisms of this type (many various embodiments are possible), the primary latch member 20' is typically prevented from retracting as long as the deadlatch lever 21 is retracted against a bias. However, if the socket 12 is significantly bigger than the primary latch member 20', and the deadlatch lever 21 is close to the primary latch member 20', the bias could push the deadlatch lever 21 outwardly into the socket 12, which would defeat the purpose of using the locking mechanism 4 of the deadlatch type.

Figure 2A:
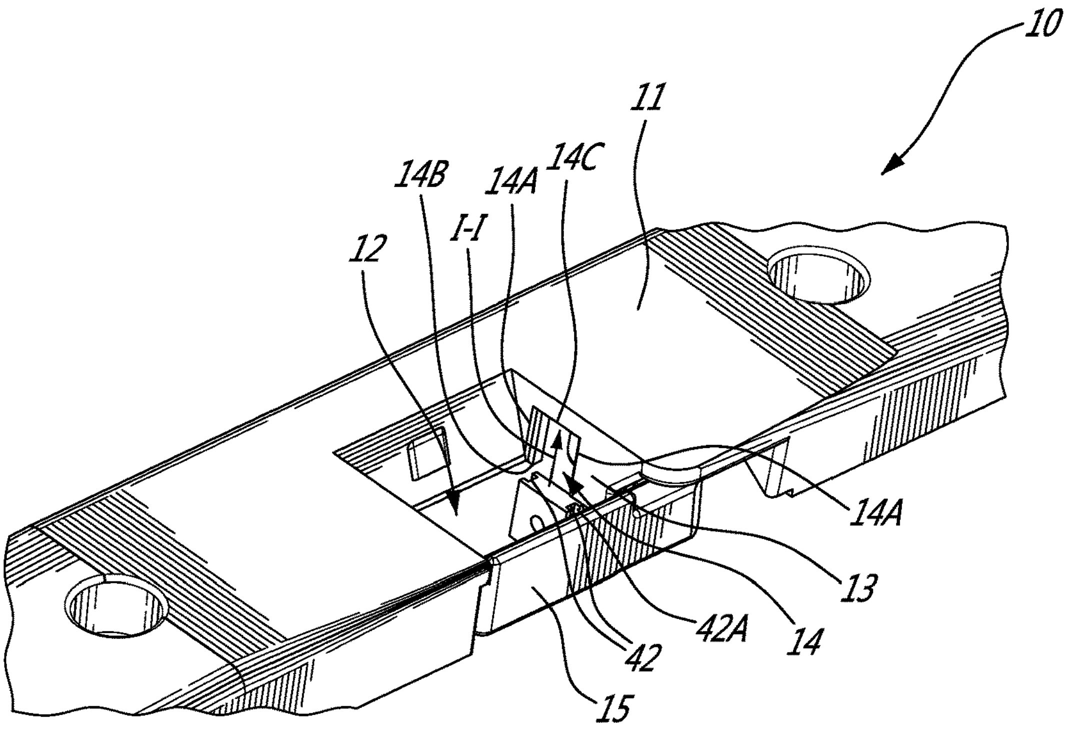
FIG. 2A to 2C are successive view showing the assembly of the insert and shim plate, in accordance with one embodiment.
Figure 2B:
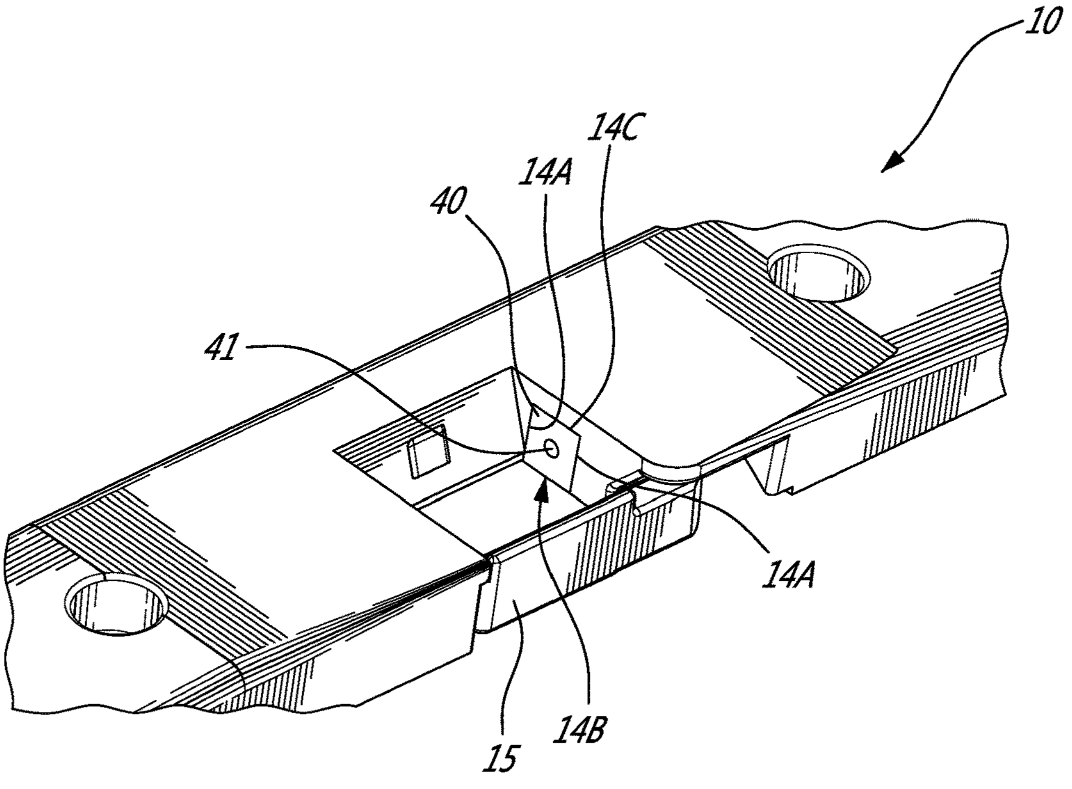
Figure 2C:
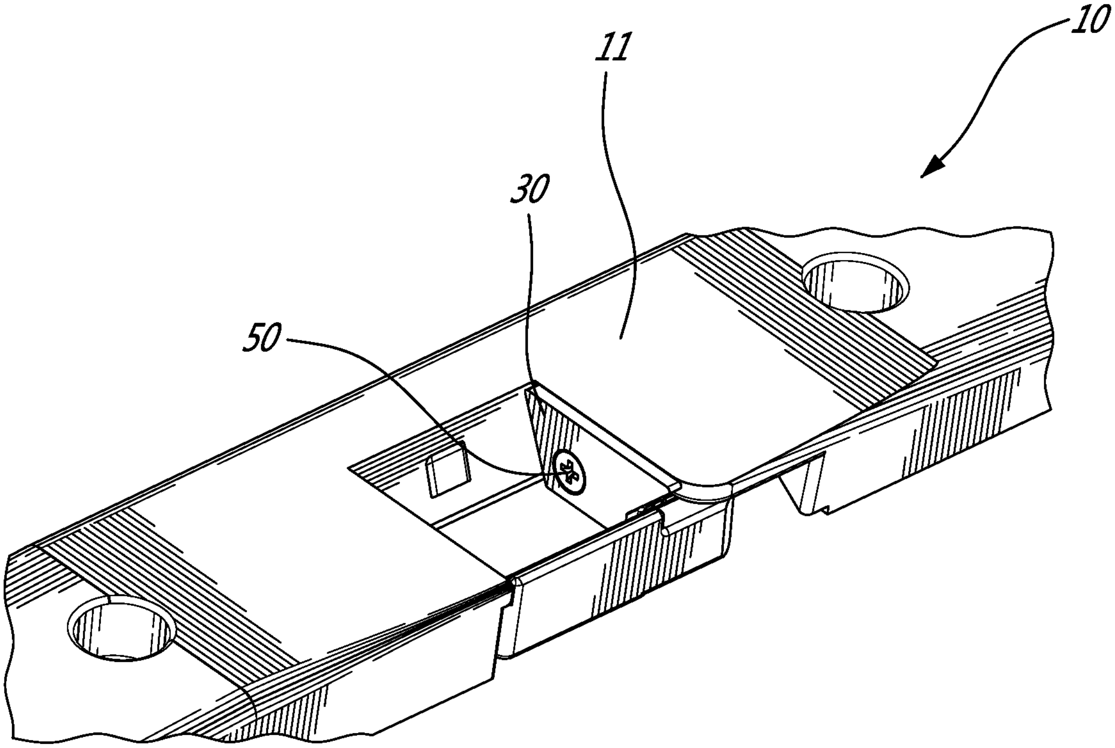

Referring to FIG. 2A to 2C, in this embodiment, a shim plate 30 can be added at the installation site to prevent this. Shim plates 30 of various thicknesses can be provided as part of an installation kit, and a shim plate 30 of the desired thickness, or a combination of superposed shim plates 30 collectively having the desired thickness, can be selected at the installation as a function of the knowledge available then and the particularities of the specific installation. The wall of the socket 12 which receives the shim plate 30 will be referred to herein as the shim-receiving wall 13. In this embodiment, the socket 12 has four walls arranged in a rectangular prism shaped arrangement.

In this embodiment, it was not possible, or otherwise not practical, to provide a female thread 41 directly into the shim-receiving wall 13 of the socket 12. This can occur in cases where the remainder of the housing H blocks satisfactory tool access to the wall 13, for instance. To overcome this limitation, the shim-receiving wall 30 was provided with a receiver aperture 14 which is adapted to receive an insert 40. The insert 40 has a female thread 41 configured to receive a fastener's male thread (see FIG. 2C) to secure the shim plate 30 between the insert 40 and the fastener's head.

As will be discussed in further detail below, the insert 40 can be presented in various shapes and forms. It can be designed to either slidingly engage the receiver aperture 14, or to snappingly engage the receiver aperture 14. Similarly, rather than being provided as a separate component and secured thereto by a fastener 50, such as a screw, the shim plate 30 can be made integral to the insert 40, such as by providing the shim plate 30 and insert 40 as a single component moulded of the same material or of different materials (e.g. overmoulding), or by adhering the shim plate 30 to the insert 40 using an adhesive, to name possible examples. However, before discussing examples of alternate embodiments, a first embodiment will first be presented in detail.

In this first embodiment, the receiving aperture 14 is rectangular, has two parallel internal edges 14A leading, in a direction going away from the strike face 11, to an open edge/side 14B. An insert 40 is provided separately. The insert 40 has a rectangular shape mating in size with the receiving aperture 14, and having two parallel external edges 42 which are designed to slidingly engage the two parallel internal edges 14A of the receiving aperture 14 along an insert engagement path I-I extending from the open edge 14B of the receiving aperture 14 to a distal edge 14C. The insert 40 has a female thread 41 extending across its thickness, between the two parallel external edges 42. In this embodiment, the two parallel internal edges 14A of the receiving aperture 14 more specifically form male sliding members, and the two parallel external edges 42 of the insert 40 have grooves 42A forming mating female sliding members, but it will be understood that it is possible to interchange male and female components of either one, or both, of the mating sliding engagements, while achieving equivalent functionality.

In different embodiments, the male and female sliding engagement can be provided in various ways. For instance, the male component can be corresponding edges of a component provided in the form of a metal sheet. Alternately, the male component can be provided as part of a plastic structure covered by a metallic cover.

In the embodiment shown, the insert 40 is engaged with the receiving aperture 14 before mounting the strike 10 to the receiving area of the door frame 3. In this manner, the insert 40 can become trapped between the distal edge 14C and a back cover plate (not shown) of the strike 10 assembly. Alternatively, if a back cover plate is not used in a particular embodiment, the insert 40 can become trapped between the distal edge 14C and the door frame 3 once mounted to the door frame 3, for example.

It will be noted that the sliding feature is optional, and that other forms of engagement between the insert 40 and the housing H can be used, as will now be explained by making parallels with embodiments shown in FIGS. 3A, 3B and 4B.

Figure 3A:
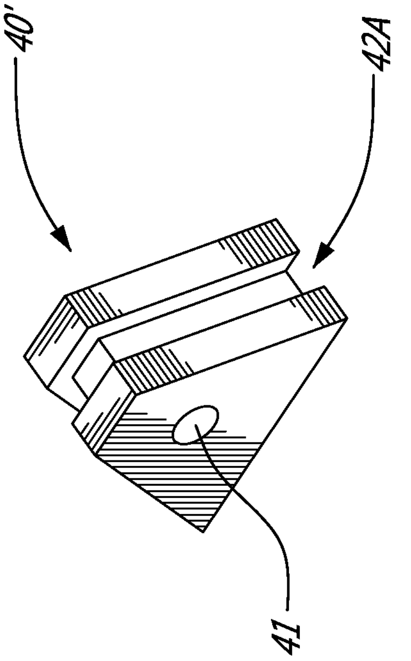
FIGS. 3A and 3B show alternate embodiments of inserts.
Figure 3B:
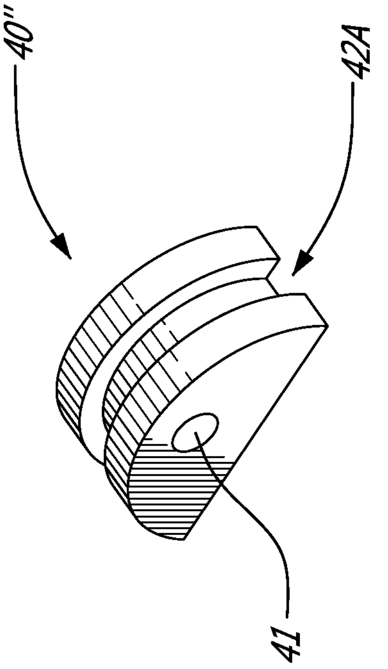

Referring to FIGS. 3A and 3B, alternate embodiments of inserts 40', 40" are shown which can be inserted into the receiving aperture 14 from an open end 14B thereof. In FIG. 3A, the insert 40' is generally triangular in shape, whereas in FIG. 3B, the insert 40" is generally semi-circular in shape. In both cases, a correspondingly shaped receiving aperture 14 can be used, the insert 40', 40" can be positioned into engagement via the open end 14B of the receiving aperture 14, and locked into place by a back plate, door frame 3, or any other suitable form of stop.

Figure 4A:
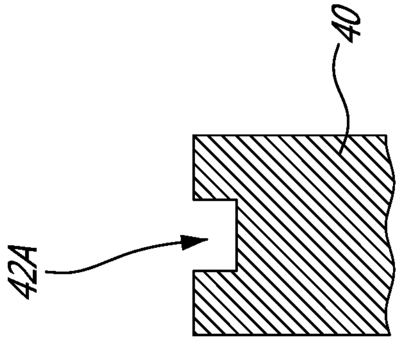
FIGS. 4A and 4B are cross-sectional views of inserts, with FIG. 4A showing an insert of the sliding type and 4B an insert of the snapping type.
Figure 4B:
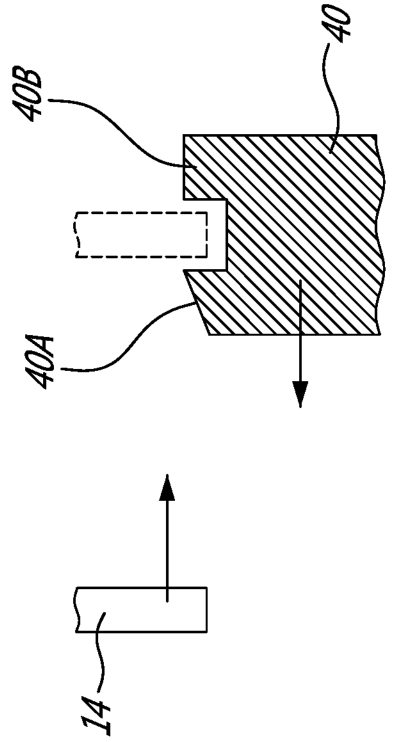

Referring to FIG. 4B, in an alternate embodiment, the insert 40, 40', 40" can have any suitable shape matching the shape of the receiving aperture 14, and the receiving aperture 14 can be a closed shape. Indeed, in some cases, it can be difficult to form a closed shape in a housing H, and easier to form a receiving aperture 14 having an open edge 14B, but this is not necessarily the case in all embodiments, and some embodiments can have a receiving aperture 14 having edges forming a closed shape, such as a full rectangle, circle, etc. In this embodiment, rather than being inserted by moving it in the plane of the wall from an open end 14B, the insert 40, 40', 40" can be inserted into the receiving aperture 14 by moving it along an orientation normal to the wall 13, and snapped into engagement with an edge or edges of the receiving aperture 14. As shown, in FIG. 4B which shows a cross-section of a portion of an insert 40, a leading edge of the insert 40 can have a ramp feature 40A, and the insert 40 can have a certain level of resilience such that the ramp feature 40A becomes compressed when pushing the insert 40 transversally until the corresponding edge of the receiving aperture 14 snaps into position between the ramp feature 40A and a stop feature 40B.

In the embodiment shown in FIGS. 2A to 2C, the strike assembly 10 is adapted to an electric strike of the surface mounted type. This is optional, and the strike assembly 10 can be adapted to alternate configurations which are not electric strikes, are not surface mounted type strikes, or are neither electric nor surface mounted strikes. As shown, the electric strike has a housing H bearing the strike face 11, the socket 12 having three fixed walls including the shim-receiving wall 13, a keeper 15 forming a fourth one of the walls and being vertically oriented when in a closed configuration, and a locking mechanism 4 housed within the housing H and operable to selectively lock and unlock the keeper 15 in the closed configuration, the four walls being in a rectangular cross-sectional shape.

Figure 5:
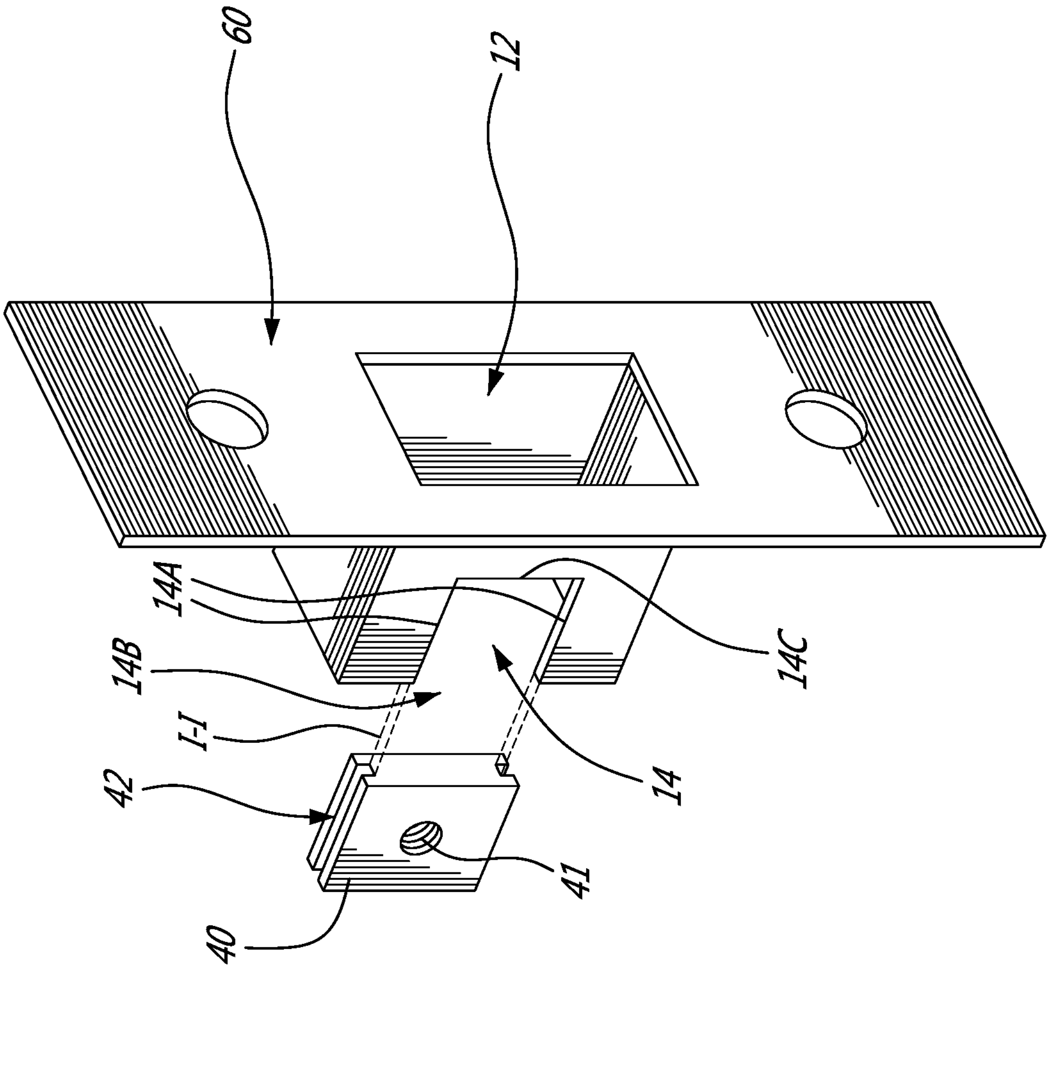
FIG. 5 shows another embodiment of a locking system having a shim-receiving insert.

For instance, FIG. 5 shows such an embodiment in which a receiving aperture 14 and insert 40 arrangement is adapted to a strike plate 60 of the box type. This embodiment can have similar components for the receiving aperture 14, insert 40, shim plate 30, and fastener 50 than the corresponding ones presented in relation with FIGS. 2A to 2C. However, it is understood that electric strikes having elaborated housings H can pose a greater challenge to shimming at the installation site, and can thereby be particularly well adapted to incorporating an insert arrangement.

Figure 6:
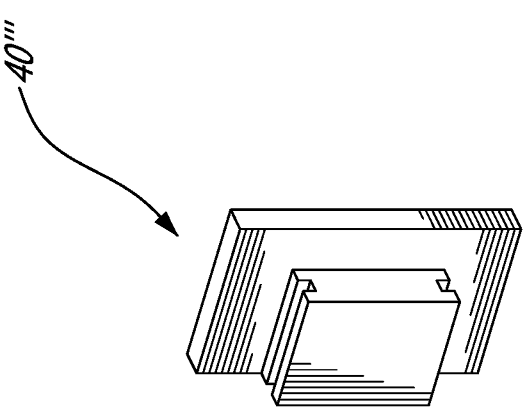
FIG. 6 shows still another embodiment in which the shim plate and insert are made integral to one another, rather than as separate components assembled to one another.

Referring now to FIG. 6, an embodiment is shown in which rather than being provided as separate components assembled to one another with a fastener 50, the shim plate 30 and the insert 40 are made integral to one another, as a single component. As such, the insert 40 does not have or require a female thread 41. The insert and shim component 40''' of FIG. 6 can be used, for instance, as an alternative to the insert 40 shown in FIG. 5. Some embodiments are more suitable than others for integrating insert 40 and shim plate 30 into a single component. Indeed, reverting to the embodiment shown in FIG. 2A-2C, it will be noted that in this embodiment, the outer edge of the shim receiving wall 13 (the one coinciding with the strike face 11) is wider than the internal edge of the shim receiving wall 13 (the one coinciding with the door frame 3). In other words, the shim receiving wall 13 had a somewhat trapezoidal shape. To achieve a suitable fit, it was preferred to use a shim plate 30 which had a matching trapezoidal shape in that embodiment, with a longer external edge and a shorter internal edge. As such, sliding the shim plate 30 into position along the plane of the shim receiving wall 13, from the internal side, was not possible. Therefore, in this configuration, where the insert 40 is slid into position along the plane of the shim receiving wall 13 from the internal side, it was not found suitable to integrate the shim plate 30 and the insert 40 into a single component. This constraint is not present in all embodiments, and there can be some embodiments where it is perfectly satisfactory to integrate the shim plate 30 and the insert 40 as a single component. This can be the case, for instance, in the case of receiving apertures 14 having an inner open edge, for shim plate 30 shapes having external edges shorter or equal to the internal edge. This can also be the case, for instance, in the case of inserts 40 which snap into engagement into the receiving aperture 14 along an axis normal to the shim receiving wall 13.

In this specific embodiment, the primary locking member 20' and deadlatch lever 21 can be provided in the form of a pullman type latch integrated to a panic bar 22, and the deadlatch lever 21 can have a U shape partially surrounding a spring latch acting as the primary locking member 20', or be narrower and immediately adjacent to the primary locking member 20', but other configurations are possible in alternate embodiments. Similarly, the socket 12 is not necessarily made of four walls in a rectangular cross-section arrangement. In some embodiments, it could be desired to have a box type strike plate 60 with only one, two, or three walls, for instance. Moreover, in alternate embodiments, the threaded insert 40 can be designed to become engaged with a corresponding aperture in the socket 13 wall by other ways than being slid into position. For instance, the threaded insert 40 can be snapped into position in alternate embodiments.

As can be understood, the examples described above and illustrated are intended to be exemplary only. The scope is indicated by the appended claims.

What is claimed is:

1. A strike assembly for mounting to a door frame, the strike assembly having a strike with a strike face, a housing bearing the strike face, a socket in the strike face for receiving a male locking member retractably mounted to a door, the socket having a shim-receiving wall integral to and normal to the strike face, the socket having three fixed walls including the shim-receiving wall, the shim-receiving wall being a fixed wall with respect to the housing, the shim-receiving wall having a receiving aperture, an insert being securely engageable into the receiving aperture along an insert engagement path, and a shim plate held firmly in the socket, against the shim-receiving wall, by the insert, when the insert is engaged into the receiving aperture.

2. The strike assembly of claim 1 wherein the shim plate has a shape and size matching a shape and size of the shim-receiving wall.

3. The strike assembly of claim 1 wherein the insert has a female thread extending normal to the shim-receiving wall when the insert is engaged into the receiving aperture, the shim plate having a bore defined therethrough in a manner to be superposable to the shim-receiving wall when the insert is engaged in the receiving aperture, in a configuration where the bore is aligned with the female thread, further comprising a fastener engageable across the bore, into the female thread, for securing the shim plate against the shim-receiving wall.

4. The strike assembly of claim 3 wherein the receiving aperture has two parallel internal edges leading away from the strike face to an open edge, the insert having two parallel external edges being slidingly engageable with the two parallel internal edges of the receiving aperture along the insert engagement path, the insert engagement path being parallel to the shim-receiving wall and normal to the strike face, wherein the shim plate includes superposed shim plates, wherein the shim plate has an internal edge coinciding with the open edge, and an external edge being parallel to the internal edge, the external edge being longer than the internal edge.

5. The strike assembly of claim 1 wherein the receiving aperture has two parallel internal edges leading away from the strike face to an open edge, the insert having two parallel external edges being slidingly engageable with the two parallel internal edges of the receiving aperture along the insert engagement path, the insert engagement path being parallel to the shim-receiving wall.

6. The strike assembly of claim 5 wherein the two parallel internal edges of the receiving aperture form male sliding members, and wherein the two parallel external edges of the insert have grooves forming mating female sliding members.

7. The strike assembly of claim 5 wherein the strike is configured to be mounted to the door frame, the receiving aperture has a third internal edge proximate the strike face and forming an end to the insert engagement path, wherein, when the strike is mounted to the door frame, the insert is trapped between the third internal edge and the door frame.

8. The strike assembly of claim 7 wherein the shim-receiving wall is horizontally-oriented when mounted to the door frame.

9. The strike assembly of claim 1 wherein the shim-receiving wall is formed of a sheet material.

10. The strike assembly of claim 9 wherein the shim-receiving wall is made of metal.

11. The strike assembly of claim 1 wherein the strike is an electric strike having a keeper forming a fourth one of the walls and being vertically oriented when in a closed configuration, and a locking mechanism housed within the housing and operable to selectively lock and unlock the keeper in the closed configuration, the four walls being in a rectangular cross-sectional shape.

12. The strike assembly of claim 1 wherein the strike is a strike of the surface mounted type, having an internal face opposite the strike face being configured to be fastened to a flat receiving face of the door frame.

13. A method of mounting a strike assembly to a door frame, the strike assembly having a strike with a strike face, a housing bearing the strike face, a socket in the strike face for receiving a male locking member retractably mounted to a door, the socket having a shim-receiving wall made integral to the strike face and projecting normal to the strike face, the socket having three fixed walls including the shim-receiving wall, the shim-receiving wall being a fixed wall with respect to the housing, the shim-receiving wall having a receiving aperture and two parallel internal edges, an insert having two parallel external edges and a female thread, a shim plate having a bore, and a fastener, the method comprising:

- engaging the insert into the receiving aperture, including matingly engaging the two parallel external edges of the insert with the two parallel internal edges of the shim-receiving wall via an open side of the receiving aperture and sliding the insert into full engagement with the receiving aperture;
- mounting the strike, with the engaged insert, to the door frame;
- engaging the shim plate into the socket, and superposing it with the shim-receiving wall in a manner for the bore to be aligned with the female thread;
- engaging the fastener across the bore and into the female thread to secure the shim plate against the shim-receiving wall.

14. A door system comprising a door hinged at a first edge to a first side of a door frame via a door hinge, the door having a locking mechanism of the deadlatch type and including a primary latch member and a deadlatch lever both retractably mounted to the door in a manner to protrude from a second edge of the door opposite the hinge, adjacent one another, the primary latch member being spring-biased to an extended configuration and being locked in an extended configuration when the deadlatch lever is in a retracted configuration, and a strike assembly, the strike assembly having a strike with a strike face for holding the deadlatch lever in the retracted configuration, the strike being mounted to the door frame, a housing bearing the strike face, a socket in the strike face for receiving the primary latch member, the socket having a shim-receiving wall integral to and extending normal to the strike face, away from the door, the socket having three fixed walls including the shim-receiving wall, the shim-receiving wall being a fixed wall with respect to the housing, the shim-receiving wall having a receiving aperture, and an insert being securely engaged into the receiving aperture along an insert engagement path, and a shim plate held firmly in the socket, against the shim-receiving wall, by the insert.

15. The strike assembly of claim 14 wherein the insert has a female thread extending normal to the shim-receiving wall when the insert is engaged into the receiving aperture, the shim plate having a bore defined therethrough, aligned with the female thread, further comprising a fastener engaged across the bore, into the female thread, securing the shim plate against the shim-receiving wall.

16. The strike assembly of claim 14 wherein the receiving aperture has two parallel internal edges leading away from the strike face to an open edge, the insert having two parallel external edges being slidingly engageable with the two parallel internal edges of the receiving aperture along an insert engagement path being parallel to the shim-receiving wall and normal to the strike face.

17. The door system of claim 16 wherein the receiving aperture has a third internal edge proximate the strike face and forming an end to the insert engagement path, wherein the insert is trapped between the third internal edge and the door frame.

18. The door system of claim 14 wherein the shim plate is superposed to the shim-receiving wall, the shim plate having a bore defined across a thickness of the shim plate, the bore being aligned with a female thread of the insert, further comprising a fastener engaged with the female thread across the bore, and holding the shim plate against the shim-receiving wall, the shim plate being aligned with the deadlatch lever when the primary latch member is engaged with the socket in a manner to prevent the deadlatch lever from becoming depressed into the socket.

19. The door system of claim 14 wherein the strike is an electric strike having a keeper forming a fourth one of the walls and being vertically oriented when in a closed configuration, and a locking mechanism housed within the housing and operable to selectively lock and unlock the keeper in the closed configuration, the four walls being in a rectangular cross-sectional shape.

20. The door system of claim 14 wherein the strike is a strike of the surface mounted type, having an internal face opposite the strike face being fastened to a flat receiving face of the door frame.

21. The door system of claim 14 wherein the shim-receiving wall is horizontally-oriented when the strike is mounted to the door frame.

* * * * *